United States Patent [19]

von Kaler

[11] Patent Number: 4,791,825
[45] Date of Patent: Dec. 20, 1988

[54] TRANSAXLE

[75] Inventor: Roland L. von Kaler, Tecumseh, Mich.

[73] Assignee: Tecumseh Products Company, Tecumseh, Mich.

[21] Appl. No.: 634,957

[22] Filed: Jul. 27, 1984

Related U.S. Application Data

[62] Division of Ser. No. 395,800, Jul. 6, 1982, Pat. No. 4,480,501.

[51] Int. Cl.$^4$ ............................................. F16H 3/08
[52] U.S. Cl. ........................................................ 74/371
[58] Field of Search .................. 74/366, 369, 371, 372

[56] References Cited

U.S. PATENT DOCUMENTS

| 735,012 | 7/1903 | Barnes | 74/371 |
|---|---|---|---|
| 1,044,884 | 11/1912 | Hackney | 74/371 |
| 1,135,354 | 4/1915 | Campbell | 74/371 |
| 1,508,193 | 9/1924 | Lord | 74/371 |
| 1,634,138 | 6/1927 | Dallimore | 74/371 |
| 1,740,725 | 12/1929 | Brown | 74/371 |
| 1,794,150 | 2/1931 | Cook | 74/371 |
| 1,913,949 | 6/1933 | Peterson | 74/371 |
| 1,947,033 | 2/1934 | Bush | 74/372 X |
| 1,955,845 | 4/1934 | Bush | 74/371 |
| 2,005,822 | 6/1935 | Burrell | 74/371 |
| 2,027,260 | 1/1936 | Wright | 192/3.5 |
| 2,273,807 | 2/1942 | Woytych | 74/371 |
| 2,306,545 | 12/1942 | Kummich | 74/327 |
| 2,400,728 | 5/1946 | Akers | 180/17 |
| 2,971,403 | 2/1961 | Butterworth | 74/700 |
| 3,109,326 | 11/1963 | Holtan | 74/792 |
| 3,115,048 | 12/1963 | Cape | 74/375 |
| 3,154,962 | 11/1964 | Mukherjee | 74/337 |
| 3,159,053 | 12/1964 | Engle | 74/701 |
| 3,191,447 | 6/1965 | Ollman | 74/700 |
| 3,301,079 | 1/1967 | Fletcher et al. | 74/333 |
| 3,322,257 | 1/1968 | Hungerford | 74/701 |
| 3,354,738 | 11/1967 | Ivanchich | 74/330 |
| 3,362,244 | 1/1968 | Ivanchich | 74/339 |
| 3,527,113 | 9/1970 | Detra et al. | 74/371 |
| 3,600,962 | 8/1971 | Ivanchich | 74/331 |
| 3,812,735 | 5/1974 | Von Kaler et al. | 74/371 |
| 3,999,447 | 12/1976 | Halberg | 74/701 |
| 4,103,566 | 8/1978 | von Kaler et al. | 74/701 |
| 4,174,644 | 11/1979 | Nagy et al. | 74/477 |
| 4,182,201 | 1/1980 | Mayhew et al. | 74/713 |
| 4,212,210 | 7/1980 | von Kaler et al. | 74/375 |
| 4,224,839 | 9/1980 | Von Kaler | 74/701 |
| 4,232,569 | 11/1980 | Hauser et al. | 74/701 |
| 4,283,968 | 8/1981 | Kalns | 74/701 |
| 4,289,045 | 9/1981 | Brisabois | 74/701 |
| 4,292,855 | 10/1981 | Murayama | 74/15.4 |
| 4,299,134 | 11/1981 | Roy et al. | 74/473 |

FOREIGN PATENT DOCUMENTS

| 1022502 | 3/1953 | France . | |
| 7538416 | 7/1976 | France . | |
| 116476 | 6/1918 | United Kingdom . | |
| 340194 | 12/1930 | United Kingdom | 74/372 |

Primary Examiner—Leslie A. Braun
Assistant Examiner—Dwight G. Diehl
Attorney, Agent, or Firm—Albert L. Jeffers; John F. Hoffman

[57] ABSTRACT

An improved transaxle having an intermediate shaft on which is freely journalled a plurality of forward gears and a reverse gear in close proximity thereto, and a positive-neutral-position collar disposed between the spur gears and the reverse gear. A shifting key is axially slidably disposed on the intermediate shaft and has an end portion thereof which is yieldably biased radially outwardly from the outer surface of the intermediate shaft for selectively engaging separately each of the gears freely journalled thereon. The positive-neutral-position collar has a recess radially outwardly disposed in its bore and which recess is formed to receive the yieldably biased end portion of the shifting key therein when the shift key is moved between the forward gears and reverse gears, thereby providing the user a positive indication of neutral gear position.

10 Claims, 4 Drawing Sheets

TRANSAXLE

This is a division of application Ser. No. 395,800, filed July 6, 1982, now U.S. Pat. No. 4,480,501.

BACKGROUND OF THE INVENTION

This invention pertains to transmissions, and more particularly to an improved gear shifting arrangement for an in-line transmission, and a ring gear assembly for a differential.

One of the objectives of the present invention is to improve upon the shifting operation of the transmission disclosed in U.S. Pat. No. 3,812,735 issued on May 28, 1974, and assigned to the assignee of the present invention. In that particular transmission, a plurality of gears are freely journalled on one end of an intermediate shaft and a reverse gear is mounted on the opposite end of the intermediate shaft. Gear selection is accomplished by a key slidably disposed in a groove axially disposed in the outer surface of the intermediate shaft, wherein one end of the key is yieldably biased radially outwardly from the outer surface of the intermediate shaft. A shifting mechanism selectively slides the key within the groove so that the forward gears may be individually selected with the biased end of the key and reverse gear may be selected by the opposite, blunt end of the key. Because the end of the key which engages the forward gears is biased radially outwardly, engagement of a selected gear is always possible since the biased end of the key may be moved radially inwardly by each gear to engage a particular key-engaging slot in the gear bore, regardless of the angular position of the gear on the shaft relative to the key. However, since reverse gear is selected by the opposite, blunt end of the key, which blunt end is not biased radially outwardly, engagement of reverse gear upon sliding the key within the groove is not always assured, and in those instances where the blunt end of the key does not initially engage the key-engaging slot in the bore of the reverse gear, double-clutching is required to properly engage the blunt end with the key-engaging slot. Such double-clutching is undesirable and time-consuming, and in certain circumstances may be cumbersome or difficult to perform.

In those transmissions and transaxles utilizing differentials, disadvantages exist in the assembly of the ring gear and bevel gear arrangement. Specifically, some transmissions and transaxles utilize a differential carrier of single-piece, cast iron construction to carry side-by-side the ring gear and bevel gears. Because this differential carrier must support both the ring gear and bevel gears separately, it is generally a heavy, large item requiring a large number of support bearings, or fewer support bearings having stronger material properties to satisfactorily support the differential carrier within the transmission or transaxle.

This particular differential carrier therefore adds undesirable costs to the product in terms of parts and labor.

A prior art transmission in which the carrier is eliminated is disclosed in U.S. Pat. No. 4,232,569 issued on Nov. 11, 1980. In this particular transaxle, the differential carrier is eliminated and the ring gear carries the bevel gears within its interior by means of a supporting center pin. This particular transaxle has consequently disposed with the differential carrier and the additional bearing requirements thereof. However, by eliminating the support bearings necessary for a differential carrier, other bearing support is required and is provided by this particular transaxle by a pair of annular shoulders on the ring gear and a complementary pair of annular shoulders in the housing cavity containing the differential. As disclosed in this particular patent, the annular shoulders of the cavities form the full bearing surfaces for the ring gear annular shoulders, and also serve to keep the teeth of the ring gear radially spaced apart from the inner surface of the housing cavity.

The bearing surfaces provided by the annular shoulders of the housing cavity are not particularly large and it is generally well known that the smaller the bearing surface area for a given exerted force, the greater the pressure loads experienced by that smaller bearing surface. Disadvantages generally resulting from smaller bearing surfaces are higher running temperatures within the housing and a generally shorter useful life.

Another costly disadvantage with some of the prior art transmissions and transaxles is present when a single-piece input shaft is used to transfer power to the intermediate shaft and thereafter to the output shafts. Such single-piece input shafts generally extend the full length of the housing and the forces exerted thereon may cause the input shaft to tend to bow or twist. Eventually, these exerted forces against the input shaft cause premature failure of the bearings supporting the input shaft within the housing, thereby requiring disassembly of the transmission or transaxle, replacement of the prematurely failed bearings, and reassembly thereof at an undesirable cost in material and labor.

SUMMARY OF THE INVENTION

The improved transaxle of the present invention overcomes the disadvantages and problems of the prior art by mounting a reverse gear adjacent the forward gears so that reverse gear may be easily engaged by the biased end of the key and disposing a positive neutral position collar between reverse gear and the forward gears, and providing a ring gear assembly that possesses a larger bearing surface between the ring gear and the housing inner surface.

In contrast to the transmission disclosed i U.S. Pat. No. 3,812,735, which is incorporated herein by reference, the present invention's reverse gear has been mounted in close proximity to the forward gears so that the biased end of the key is used to engage and disengage reverse gear, thereby eliminating double-clutching necessitated by using the blunt end of the key to engage reverse as earlier described. Because the forward gears and reverse gear are in close proximity with each other, a positive neutral position collar is disposed on the shaft between the forward gears and the reverse gear to give the user a positive indication or "feel" of the transmission or transaxle being in a neutral gear position. This positive neutral position is provided by a recess radially outwardly disposed in the inner surface of the collar and which is shaped to conform to the shape of the biased end of the key.

In one embodiment, the collar has a slot-shaped recess which captures the biased end of the key when it is shifted between the forward gears and reverse gear, while in a second embodiment the collar has a circular recess which also captures the biased end of the key when it is positioned between the forward gears and reverse gear.

Additional advantages accruing by moving reverse gear adjacent the forward gears and disposing the collar therebetween are the elimination of several washers which are placed in counterbores in the gears. Since these transmissions or transaxles are manufactured in large quantities, a small saving per product unit, for example, the washers previously mentioned, results in a substantial savings in material and labor costs.

Of particular note in the present invention is the arrangement of the ring gear assembly wherein an increase in bearing surface area is provided by using the radial outer surfaces of the ring gear teeth as bearing surfaces for the ring gear. The bevel gears of the differential are mounted within the interior of the ring gear, thereby eliminating additional or special bearings such as are required for differential carriers. Support and bearing surface for the ring gear are provided by a pair of arcuately-shaped powder metal shoes disposed between the housing cavity and the teeth of the ring gear, which rests directly against the inner surface of the two shoes. When the ring gear is driven, the radial outer surfaces of the ring gear teeth rotate against the surface of the two powder metal shoes to provide support and a bearing surface for the ring gear. The beneficial and advantageous result of using the teeth, and not annular shoulders as taught in U.S. Pat. No. 4,232,569, is the increase in size of the bearing surface provided by the ring gear teeth, which reduces pressure loads on the ring gear exerted by a given force. The larger the surface area over which a given force is exerted, the smaller the pressure load experienced by that surface area, and in this particular case results in cooler running of the transmission or transaxle and a longer useful lifespan.

Further, the two shoes have flanges peripherally disposed radially inwardly therefrom and between the sides of the ring gear and the inner surface of the housing cavity to provide a bearing surface against axial forces and support against axial movement exerted by the output shafts.

The shoes rest in the housing cavity to allow for easy installation and replacement and are held in place by two casting stops that prevent the shoes from rotating within the housing cavity. Lubrication of the ring gear and shoes is provided by a suitable heavy duty grease.

Additional savings in cost is provided by a split input shaft which breaks up and divides forces exerted thereon to thereby substantially eliminate any tendencies to bow or twist as experienced by a single-piece input shaft. By providing the split input shaft to substantially eliminate any bowing or twisting tendencies, premature failure of bearings and their costly replacement is practically eliminated.

As described above, the improved transaxle of the present invention is simple in design, assembly, and operation, thereby resulting in a product easily and economically manufactured with a savings in material and labor expenditures.

In the broader aspects of this invention, there is provided in a differential for a transmission having a housing, output shafts journalled in the housing, and a gear assembly coupling the proximal ends of the output shafts together, a ring gear assembly comprising a ring gear having a plurality of teeth on its outer surface and connected to the gear assembly, the housing having a cavity formed therein to receive the ring gear and the gear assembly. A bearing device is radially disposed between the ring gear teeth and a portion of the inner surface of the housing cavity, and includes an annular inner bearing surface on which the ring gear teeth are directly supported against radial loads and movements.

Another aspect of the present invention provides in a transmission including a housing, a shaft journalled in the housing and having an axially disposed groove in the outer surface thereof, a plurality of forward gears and a reverse gear freely journalled o the shaft and having respective key-engaging slots in respective bores therein, a key selectively slidable in the axially disposed groove and having an end portion yieldably biased radially outwardly from the shaft outer surface, the key end portion having separate engagements with respective key-engaging slots of the forward gears when the key is axially shifted to thereby drivingly engage a selected gear to the shaft, and a shifting mechanism for axially sliding the key in the groove, an improvement comprising a positive neutral position collar disposed on the shaft between the forward gears and reverse gear, and having key-receiving means in a bore therein. The key-receiving means is formed to receive the end portion of the key when shifted between reverse gear and the forward gears to maintain the key in a positive neutral position on the shaft.

It is an object of the present invention to provide an improved transaxle which permits engagement of reverse gear with the biased end of the shifting key, and which provides therewith a positive neutral position collar between the forward gears and reverse gear to give the user a positive indication of a neutral position.

Another object of the present invention is to provide a larger bearing surface area between the ring gear and the housing cavity to thereby reduce pressure loads experienced by the ring gear during operation.

A further object of the present invention is to provide an improved transaxle which is simple in design and easily assembled, thereby providing a more economically manufactured product.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figures 1, 1A:
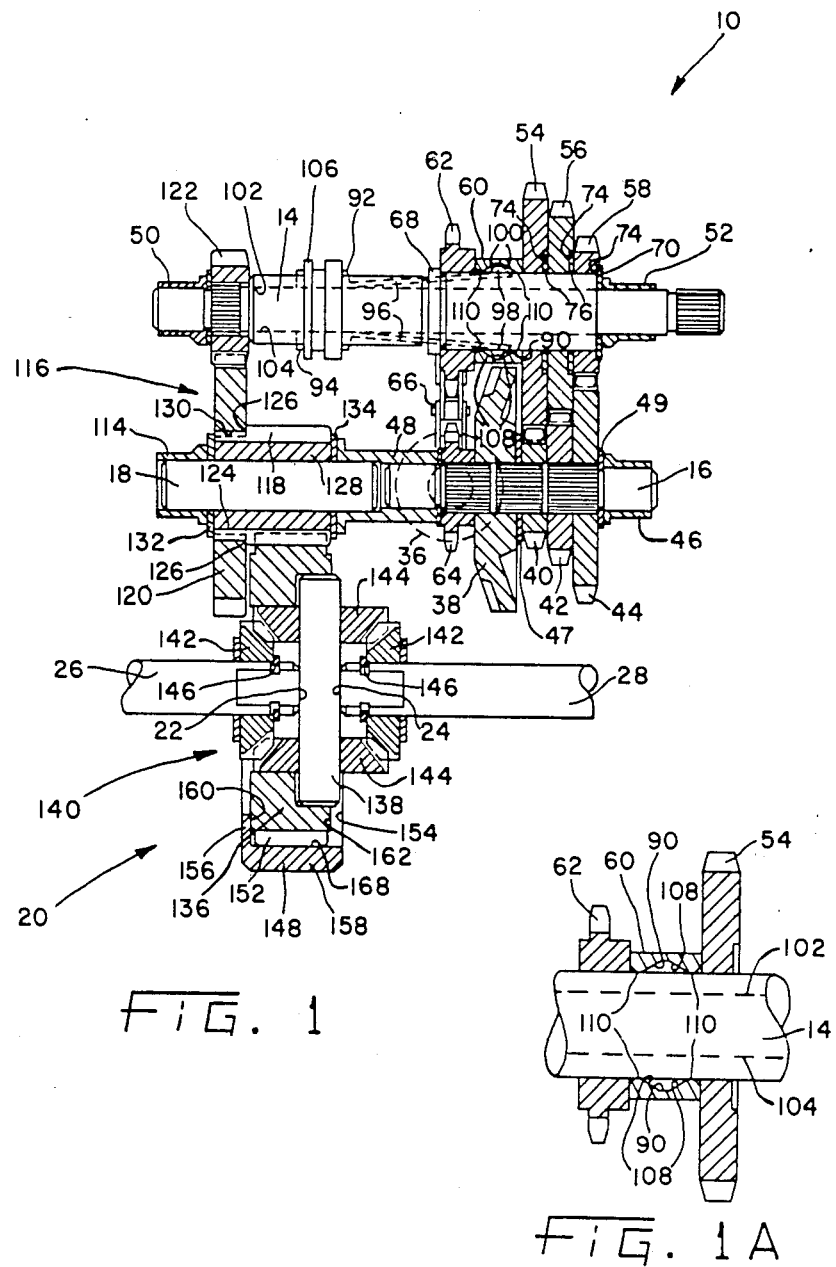
FIG. 1 is a sectional view of a preferred embodiment of the present invention with the housing and shifting mechanism removed.
FIG. 1A an enlarged, broken-away portion of the intermediate shaft with the positive-neutral-position collar thereon.

Referring to FIG. 1, improved transaxle 10 comprises in part housing lower half 12 having intermediate shaft 14, countershaft 16, and shaft 18 freely journalled therein, and differential 20 coupling proximal ends 22, 24 of output shafts 26, 28, respectively. Provided within housing lower half 12 are grease receptacles 30 adjacent output shafts 26, 28 for containing a suitable lubricant therein. Improved transaxle 10 includes a housing upper half which is not shown, but is similar to and mated with housing lower half 12 to enclose improved transaxle 10. Housing lower half 12 and the upper housing half which is not shown are both die cast by an injection molding technique resulting in the surfaces of the housing halves being very smooth and substantially free of machining marks, thereby permitting the housing halves to act as natural bushings for output shafts 26, 28.

Brake assembly 32 having brake disc 34, and a shifting mechanism (not shown) are included with transaxle 10; brake assembly 32 being of a conventional type, and the shifting mechanism being similar to the one disclosed in U.S. Pat. No. 3,812,735.

Turning attention now to countershaft 16, bevel gear 36 is drivingly meshed with bevel gear 38 which together with spur gears 40, 42, 44 is secured to rotate with countershaft 16. Bevel gear 38 and spur gears 40, 42, 44 are secured to rotate with countershaft 16 in a conventional manner or as disclosed in U.S. Pat. No. 3,812,735. Countershaft 16 is freely journalled in bearing 46 and flange bushing 48, and washers 4, 49 are positioned between bevel gear 38, spur gear 40 and spur gear 44, bearing 46, respectively.

Intermediate shaft 14 is freely journalled in flange bushings 50, 52 in housing lower half 12, and has freely journalled on one end thereof spur gears 54, 56, 58, which are in constant running mesh with spur gears 40, 42, 44, respectively.

Positive-neutral-position collar 60 is freely journalled on intermediate shaft 14 in abutment against spur gear 54, and reverse gear 62 is freely journalled on intermediate shaft 14 in abutment against the opposite end of collar 60 as illustrated in FIG. 1A. The portion of shaft 14 on which gears 54, 56, 58, 62 and collar 60 are journalled has a constant diameter. Sprocket 64 is keyed to countershaft 16 for rotation therewith an drives reverse gear 62 on intermediate shaft 14 by means of an endless roller chain 66. Again, a more detailed description of the above construction may be found in U.S. Pat. No. 3,812,735.

Figure 2:
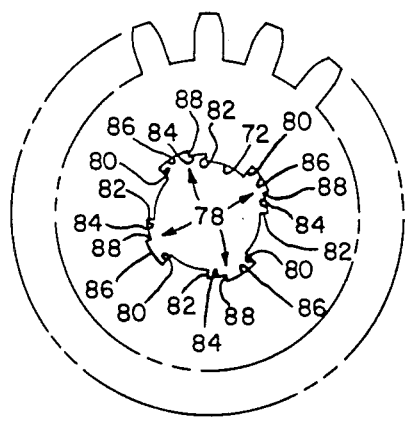
FIG. 2 is an axial end elevational view of a freely journalled gear of a preferred embodiment of the present invention.

Gears 54, 56, 58, reverse gear 62, and collar 60 are axially retained on intermediate shaft 14 by shoulder 68, which may be integral to intermediate shaft 14, and washer 70 disposed between gear 58 and flange bushing 52. As shown in FIGS. 1 and 2, each gear 54, 56, 58, 62 has an axial bore 72 therethrough to receive intermediate shaft 14 for free rotation of the particular gear thereon, and a counterbore 74 (FIG. 1) in one face thereof in which a flat washer 76 is located either by merely seating in the counterbore 74 so as to be readily removable, or being fixed in a counterbore 74 as by brazing or sintering to the gear face. It should be noted that the flat washer which sits in counterbore 74 of gear 58 has been previously numbered as washer 70. Additionally, washers 76 have diameters approximately equal to the diameter of a bore 72.

Continuing to refer to FIG. 2, each gear 54, 56, 58, 62 has four symmetrically arranged arcuate slots 78 in bore 72 which extend axially through the gear and terminate circumferentially at generally radially extending opposed end walls 80, 82. Each slot 78 has a generally arcuately extending step 84 therein and a shift key retaining slot 86 extending generally radially outwardly of step 84, the junction of step 84 with slot 86 being defined by an abutment wall 88 extending radially and axially of the particular gear.

Referring to FIGS. 1, 1A, collar 60 has a circular recess 90 disposed in its inner surface adjacent the outer surface of intermediate shaft 14, and circumferentially disposed thereabout. Recess 90 is formed into a particular cross-sectional shape for reasons which will be further explained below.

Gears 54, 56, 58, 62 are selectively coupled for rotation with intermediate shaft 14 by two identical shift keys 92, 94, each of which has a cantilever spring arm 96 yieldably biased generally radially outwardly of intermediate shaft 14, and a lug 98 located adjacent the free end of the particular key 92, 94 and radially outwardly from the outer surface of intermediate shaft 14. Lugs 98 each have camming ramps 100 which slidably engage with washers 76 in response to axial movement of the particular key lug 98 through the gears 54, 56, 58, 62 to selectively and individually engage and disengage these gears with intermediate shaft 14.

Each shift key 92, 94 is received within a respective rectangular groove 102, 104, which are diametrically opposed in intermediate shaft 14. A shift collar 106 is journalled on intermediate shaft 14 and encircles keys 92, 94 for axially shifting the keys in their respective grooves 102, 104. A more detailed description of the connections between shift keys 92, 94, shift collar 106, and the shifting mechanism (not shown) may be found in U.S. Pat. No. 3,812,735, and although more descriptive is not limitative to the present invention.

Recess 90 of collar 60 is substantially complementary to the shape of lugs 98 in that recess 90 has sloping side walls 108 formed similarly to camming ramps 100 of lugs 98. Recess 90 is just slightly larger than a particular lug 98 to ensure that lugs 98 are biased radially outwardly from the surface of intermediate shaft 14 to the maximum extent provided by respective cantilever spring arms 96. Sloping side walls 108 form with respective sides of collar 60 annular lips 110 having diameters substantially the same as the diameters of washers 76. Annular lips 110 serve the same purpose for gears 54, 62 and collar 60 as washers 76 serve for gears 56, 58.

In selecting a desired gear for engagement to intermediate shaft 14, the user operates the shifting mechanism (not shown), which is connected to shift collar 106, to axially slide shift keys 92, 94 in their respective grooves 102, 104. From the neutral position, as illustrated in FIG. 1, selection of gear 54 is accomplished by axially sliding keys 92, 94 toward the right which causes the camming ramps 100 to contact sloping side walls 08 of collar 60, thereby forcing lugs 98 radially inwardly within grooves 102, 104. Further movement to the right causes apexes 112 of lugs 98 to move radially inwardly of and axially beyond the right-most annular lip 110 to engage one of the shift key retaining slots 86 in bore 72 of gear 54, thereby engaging gear 54 to intermediate shaft 14. Engagements of gears 56, 58 are performed in a similar manner with the exception that washers 76 perform the same function as annular lip 110 in forcing lugs 98 radially inwardly to disengage them from gear 54 for subsequent engagement with gears 56, 58.

Reverse gear 62 is engaged from the neutral position as illustrated in FIG. 1 in the same manner that gear 54 is engaged by means of lugs 98 engaging one of the shift key retaining slots 86 in reverse gear 62. The left-most annular lip 110 and the adjacent sloping side wall 108 of annular recess 90 serve to force lugs 98 radially inwardly upon shifting keys 92, 94 to the left. Upon passing axially beyond the leftmost annular lip 110, lugs 98 spring outwardly under the influence of respective cantilever spring arms 96 to engage a shift key retaining slot 86 in reverse gear 62.

As described above, reverse gear 62 will be positively engaged each time shift keys 92, 94 are moved beyond the leftmost annular lip 110. This is in contrast to previous methods of engaging reverse gear with the blunt ends of shift keys 92, 94, which often would require double-clutching as earlier mentioned above.

Continuing to refer to FIG. 1, shaft 18 has one end freely journalled in flange bushing 114 in housing lower half 12 and its opposite end freely journalled i flange bushing 48. Although FIG. 1 depicts shaft 18 in axial alignment with countershaft 16, this is not a necessary requirement, but rather a convenience of utilizing flange bushing 48 for both countershaft 16 and shaft 18. Mounted on shaft 18 to rotate therewith is a two-piece gear 116 comprising inner gear 118 splined to outer gear 120, which is in mesh with spur gear 122 fixed on intermediate shaft 14 to rotate therewith. Inner gear 118 has a small diameter splined end portion 124 which forms shoulder 126 with the larger diameter end portion 128, and, upon splined end portion 124 being engaged with the splined bore 130 of outer gear 120, shoulder 126 abuts against outer gear 120. Outer gear 120 and inner gear 118 are held splined together by washers 132, 134 on shaft 18.

In operation, power is transferred from intermediate shaft 14 to shaft 18 by gear 122 on shaft 14 being in running mesh with two- piece gear 116 fixed on shaft 18.

Still referring to FIG. 1, differential 20, which is in driven mesh with inner gear 118, comprises ring gear 136, drive center pin 138, and bevel gear assembly 140. Bevel gear assembly 140 includes bevel gears 142 and bevel gears 144, which together with drive center pin 138 are carried within the interior of ring gear 136 in a manner which is known in the art. Proximal ends 22, 24, of output shafts 26, 28, respectively, are received through bevel gears 142 and abut against drive center pin 138. Output shafts 26, 28 are retained in place by retainer rings 146. By abutting proximal ends 22, 24 against drive center pin 138, any axial forces exerted against output shafts 26, 28 are exerted against drive pin 138 rather than bevel gear assembly 140, which would be the case if proximal ends 22, 24 were spaced apart from drive center pin 138. In this latter case, undesirable forces would be exerted against bevel gears 142, 144, which over an extended period of time could cause premature failure of bevel gear assembly 140.

Referring now to FIGS. 1, 3-7, one of the unique features of improved transaxle 10 are bearing shoes 148, 150 being disposed directly between teeth 152 of ring gear 136 and cavity 154 in housing lower half 12 and upper half (not shown).

Figure 3:
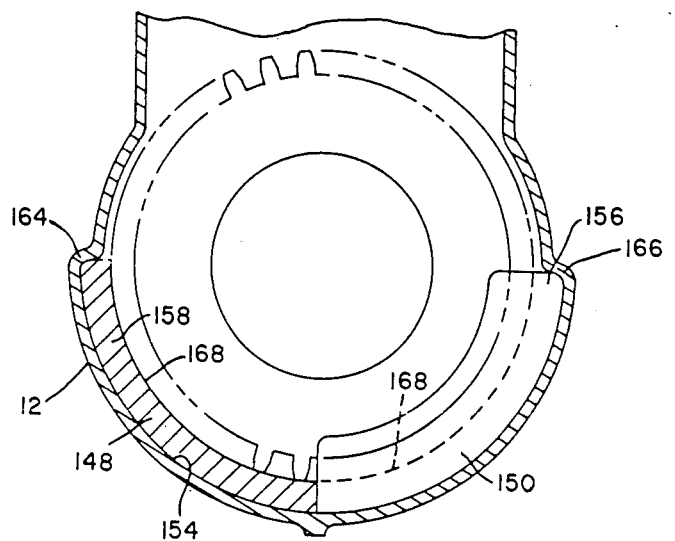
FIG. 3 is a sectional view of FIG. 8 along line 3—3 and viewed in the direction of the arrows with the bevel gears removed.
Figure 4:
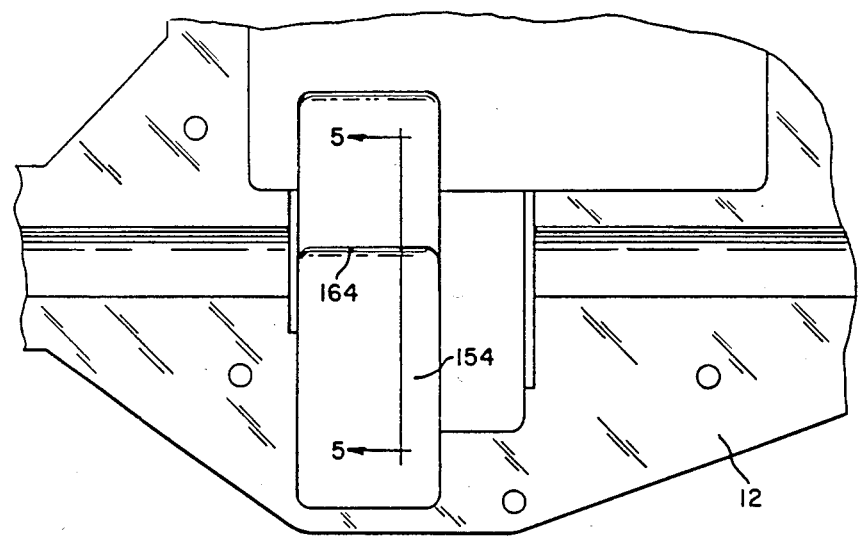
FIG. 4 is an enlarged, broken-away plan view of the housing cavity lower half.
Figure 7:
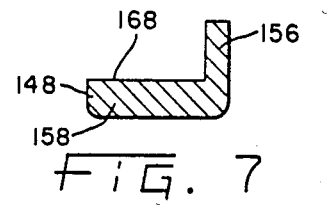
FIG. 7 is a sectional view of FIG. 6 along line 7—7 and viewed in the direction of the arrows.
Figure 6:
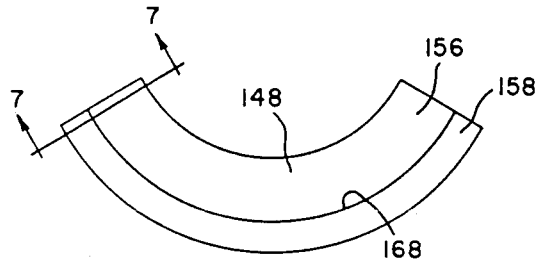
FIG. 6 is a side elevational view of a single bearing shoe.
Figure 5:
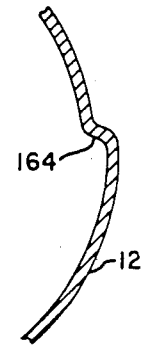
FIG. 5 is a sectional view of FIG. 4 along line 5—5 and viewed in the direction of the arrows.

Referring to FIGS. 6 and 7, each bearing shoe 148, 152 is arcuately-shaped and has a flange 156 radially inwardly extending from shoe rim portion 158. In the preferred embodiment, housing cavity 154 is arcuately-shaped to conforming receive each bearing shoe 148, 150 as depicted in FIG. 3; and, viewing FIG. 1, flange 156 of bearing shoe 148 is disposed directly between ring gear side 160 and cavity 154 and flange 156 of bearing shoe 150 is directly disposed between ring gear side 162 and cavity 154 (FIG. 3). This arrangement allows flanges 156 to act as axial bearing surfaces for both sides of ring gear 136.

In assembling differential 20, bearing shoes 148, 150 are first placed within housing cavity 154 and held therein against rotation by casting stops 164, 166 formed in housing lower half 12 and upper half (not shown). It is important at this point of assembly that flanges 156 of bearing shoes 148, 150 be oppositely disposed one from the other in cavity 154. Differential 20 and output shafts 26, 28 coupled thereto are placed in housing lower half 12 so that ring gear 136 rests directly against the inner surface 168 of bearing shoes 148, 150. Upon mating the housing upper half with housing lower half 12, ring gear 136 is supported within housing cavity 154 by flanges 156 and rim portions 158 of bearing shoes 148, 150 and inner gear 118 with which ring gear 136 is drivenly meshed.

In operation, bearing shoes 148, 150 provide bearing surfaces for ring gear 136 as it is driven by inner gear 118. B utilizing bearing shoes 148, 150 and teeth 152 of ring gear 136 as the bearing surface, a large bearing surface is provided for radial forces, which reduces pressure loads experienced by ring gear 136, thereby providing a cooler running transaxle and increasing its useful life.

In a similar manner, bearing surfaces for ring gear 136 against axially exerted forces is provided by ring gear sides 160, 162 and the respective flanges 156 against which they rotate.

Bearing shoes 148, 150 are preferably made of a sintered powder metal, such as iron or steel for example, having a preferred hardness of about 30–40 Rockwell C.

Figure 8:
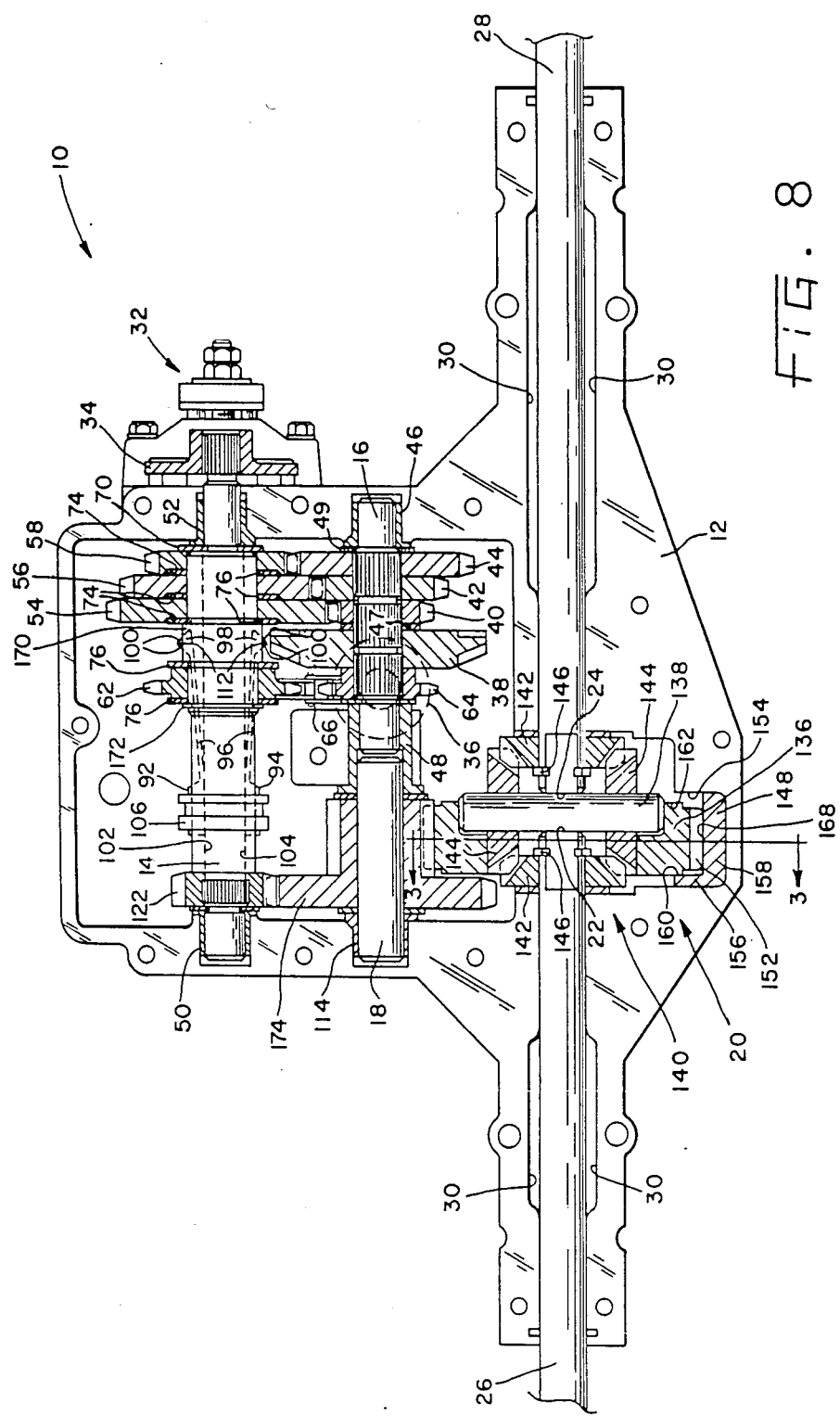
FIG. 8 is a sectional view of a second embodiment of the present invention with the shifting mechanism removed.

A second embodiment of improved transaxle 10 is depicted in FIG. 8 with the main areas of concern being the assembly of spur gears 54, 56, 58, 62 to intermediate shaft 14, and the gear assembly on shaft 18. In all other respects, the second embodiment in FIG. 8 is similar to the preferred embodiment of FIG. 1 and therefore common elements will have the same numbers as earlier.

Referring now to FIG. 8, positive-neutral-position collar 60 has been removed and in place thereof intermediate shaft 14 has been enlarged in diameter at enlarged shaft portion 170, and spur gear 54 has been provided with a counterbore 74 and a washer 76 therein. For lugs 98 to be in the neutral position as illustrated in FIG. 8, grooves 102, 104 extend axially and radially through enlarged shaft portion 170. Two additional washers 76 are further provided on either side of reverse gear 62, and spur gears 54, 56, 58 and reverse gear 62 are axially maintained in position on intermediate shaft 14 by retainer ring 172. Enlarged shaft portion 170 is integrally formed on intermediate shaft 14 during the machine process thereof.

During operation of the shifting sequence to engage individual spur gears 54, 56, 58 or reverse gear 62, the two additional washers 76 on either side of enlarged shaft portion 170 serve the same purpose for spur gear 54 and reverse gear 62 as the other previously mentioned washers 76 serve for spur gears 56, 58. Further, since reverse gear 62 is in close proximity to spur gears 54, 56, 58, enlarged shaft portion 170 allows the user to have a positive neutral indication or "feel" during the shifting sequence.

Turning our attention now to shaft 18 in FIG. 8, spur cluster 174 has replaced inner gear 118 and outer gear 120, the major difference being spur cluster 174 is a single-piece member. In all other respects, spur cluster 174 operates identically to inner gear 118 and outer gear 120 in being driven by spur gear 122 on intermediate shaft 14 and driving ring gear 136 of differential 20.

While this invention has been described as having specific embodiments, it will be understood that it is capable of further modification. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. In a transmission including a housing, a shaft journalled in said housing and having an axially disposed groove in the outer surface thereof, a plurality of forward gears and a reverse gear freely journalled on said shaft and having respective key-engaging slots in respective bores therein, a key member selectively slideable in said axially disposed groove and having an end portion yieldably biased radially outwardly from said shaft outer surface, said key member end portion having separate engagements with respective said key-engaging slots of said forward gears then said key member is axially shifted to thereby drivingly engage a selected forward gear to said shaft, and shift means for axially sliding said key member in said axially disposed groove, the improvement comprising:

said reverse gear being separately engageable by said key member end portion engaging its key-engaging slot, and a neutral gear position collar member disposed on said shaft in abutment against said reverse gear and one of said forward gears, and having key-receiving detent means in a bore therein, said key-receiving means being formed to receive said end portion of said key member therein when said key member is shifted between said reverse gear and said forward gears, thereby maintaining said key member in a positive neutral position on said shaft.

2. The transmission of claim 1 wherein said collar member rotates with said shaft, and wherein said key-receiving detent means is a recess radially outwardly disposed in said bore, said end portion of said key member being receivable in said recess when shifted between said reverse gear and said forward gears by said shift means.

3. The transmission of claim 1 wherein said key-receiving detent means is a circular recess radially outwardly disposed in said bore of said collar member, said circular recess lying in a plane substantially perpendicular to the longitudinal axis of said shaft and having said end portion of said key member receivable therein when shifted between said reverse gear and said forward gears by said shift means.

4. The transmission of claim 1 wherein said gears and said collar member are on a portion of said shaft having a constant diameter.

5. A transmission comprising: a housing, a shaft journalled in said housing and having an axially disposed groove in the outer surface thereof, a plurality of forward gears and a reverse gear freely journalled on said shaft and having respective key-engaging slots in respective bores therein;

a key member selectively slidable in said axially disposed groove and having an end portion yieldably biased radially outwardly from said shaft outer surface, said key member end portion having separate engagements with respective said key-engaging slots of said forward gears when said key member is axially shifted to thereby drivingly engage a selected forward gear to said shaft, and shift means for axially sliding said key member in said axially disposed groove;

said reverse gear being separately engageable by said key member end portion engaging its key-engaging slot; and a neutral gear position collar member disposed on said shaft between said forward gears and said reverse gear, and having a recess disposed in the bore of said collar member, and said collar including integral lip means for forcing the key member end portion radially inwardly.

6. The transmission of claim 5 wherein said recess is complementary in shape to said key member end portion so as to receive the same therein when said key member is shifted between said reverse gear and said forward gears thereby maintaining said key member in a positive neutral position on said shaft.

7. The transmission of claim 5 wherein said collar includes sides, and said lip means comprises lips formed between said recess and said sides.

8. In a transmission including a housing, a shaft journalled in said housing and having an axially disposed groove in the outer surface thereof, a plurality of forward gears and a reverse gear freely journalled on said shaft and having respective key-engaging slots in respective bores therein, a key member selectively slidable in said axially disposed groove and having an end portion yieldably biased radially outwardly from said shaft outer surface, said key member end portion having separate engagements with respective said key-engaging slots of said forward gears when said key member is axially shifted to thereby drivingly engage a selected forward gear to said shaft, and shift means for axially sliding said key member in said axially disposed groove, the improvement comprising:

said reverse gear being separately engageable by said key member end portion engaging its key-engaging slot, and a neutral gear position collar member disposed on said shaft between said forward gears and said reverse gear, and having key-receiving detent means in a bore therein, said key-receiving means being formed to receive said end portion said key member therein when said key member is shifted between said reverse gear and said forward gears, thereby maintaining said key member in a positive neutral position on said shaft, said end portion of said key member has opposed surfaces sloping axially outwardly and radially inwardly relative to said shaft, wherein said key-receiving detent means is a recess radially outwardly disposed in the bore of said collar member, said recess having opposed surfaces sloping axially outwardly and radially inwardly relative to said shaft, and said end portion opposite surface and said recess opposite surfaces slidably engaging with each outer during engagement and disengagements of said end portion and said collar member to provide a camming action therebetween.

9. The transmission of claim 8 wherein said reverse gear is engaged by camming radially inwardly one of said sloping surfaces of said key member end portion that is opposite the other of said sloping surfaces that is cammed radially inwardly by said forward gears from said recess.

10. The transmission of claim 8 wherein said collar member is in abutment against said reverse gear and one of said forward gears.

* * * * *

UNITED STATES PATENT AND TRADEMARK OFFICE
CERTIFICATE OF CORRECTION

PATENT NO. : 4,791,825

DATED : December 20, 1988

INVENTOR(S) : Roland L. von Kaler

It is certified that error appears in the above-identified patent and that said Letters Patent is hereby corrected as shown below:

```
Col. 2, line 42, after "disclosed" change "i" to --in--;
Col. 4, line 5, after "journalled" change "o" to --on--;
Col. 4, line 48, after "1A" insert --is--;
Col. 5, line 33, after "washers" change "4" to --47--;
Col. 6, line 59, change "08" to --108--;
Col. 7, line 22, after "journalled" change "i" to --in--;
Col. 8, line 2, change "conforming" to --conformingly--;
Col. 8, line 27, change "B" to --By--;
Claim 8, Col. 10, line 54, after "portion" insert --of--;
Claim 8, Col. 10, line 68, change "outer" to --other--.
```

Signed and Sealed this

Twenty-seventh Day of June, 1989

*Attest:*

DONALD J. QUIGG

*Attesting Officer*     *Commissioner of Patents and Trademarks*